United States Patent
Beiley et al.

(10) Patent No.: US 6,522,357 B2
(45) Date of Patent: Feb. 18, 2003

(54) METHOD AND APPARATUS FOR INCREASING RETENTION TIME IN IMAGE SENSORS HAVING AN ELECTRONIC SHUTTER

(75) Inventors: Mark A. Beiley, Chandler, AZ (US); Eric J. Hoffman, Chandler, AZ (US); Lawrence T. Clark, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/939,808

(22) Filed: Sep. 30, 1997

(65) Prior Publication Data

US 2002/0085106 A1 Jul. 4, 2002

(51) Int. Cl.[7] .......................... H04N 3/14; H04N 5/335
(52) U.S. Cl. .................... 348/296; 348/308; 348/310; 250/208.1
(58) Field of Search ............................... 348/296, 297, 348/298, 299, 302, 307, 308; 257/296; 250/208.1; H04N 5/335, 3/14

(56) References Cited

U.S. PATENT DOCUMENTS 5,471,515 A  11/1995  Fossum et al.

FOREIGN PATENT DOCUMENTS

JP  63041069  * 2/1988  .......... H01L/27/10

OTHER PUBLICATIONS

Kyomasu, A New MOS Imager Using Photodiode as Current Source, IEEE Journal of Solid–State Circuits, vol. 26, No. 8, pp. 1116–1123, Aug. 1991.*

Aw et al., a 128×128–Pixel Standard–CMOS Image Sensor with Electronic Shutter, IEEE Journal of Solid–State Circuits, vol. 31, No. 12, pp. 1922–1930, Dec. 1996.*

* cited by examiner

*Primary Examiner*—Ngoc-Yen Vu
(74) *Attorney, Agent, or Firm*—Blakely, Sokoloff, Taylor & Zafman LLP (57) ABSTRACT

In a pixel having an electronic shutter, a method of increasing the retention time of the electronic shutter is disclosed. A reset signal is employed to drive a diode node to a predetermined voltage immediately after integration is completed. A sample signal is employed to control a pass gate. The sample signal includes a state where the sample signal is a negative voltage.

11 Claims, 5 Drawing Sheets

METHOD AND APPARATUS FOR INCREASING RETENTION TIME IN IMAGE SENSORS HAVING AN ELECTRONIC SHUTTER

BACKGROUND OF THE INVENTION

1. Field of the Invention

The present invention relates generally to CMOS image sensors and particularly to a method and apparatus for increasing retention time in image sensors having an electronic shutter.

2. Description of the Related Art

Active Pixel Sensors (APS) sensors are now becoming viable due to their diminishing pixel size. Image sensors that are manufactured using a CMOS process exhibit many advantages over those image sensors manufactured using a CCD based process. These advantages include affordability, space savings, a reduction in power consumption, a windowed readout, increased image quality, increased speed and performance, and the availability of on-chip processing.

A CMOS image sensor can typically include an electronic shutter that mimics a mechanical shutter. A mechanical shutter is employed in cameras to control the exposure of light to film. For example, both the shutter speed and the aperture size of the shutter influence the amount of light that is permitted to reach the film. Since there is typically no mechanical shutter to control the exposure of the sensor to light in a CMOS imager, an electronic shutter is employed to in effect control the exposure to light by limiting the amount of time a storage element is allowed to charge.

An electronic shutter typically includes a pass transistor and a storage element (e.g. capacitor). The capacitor is employed to store a voltage value that represents the amount of light incident to the light sensor. The pass transistor is controlled by a sample signal that in effect controls the charge transfer time of the capacitor. The charge transfer time is simply the time that the capacitor is charged by the photodetector. The value stored by the capacitor of the electronic shutter is read out to be manipulated or stored. The readout rate of a pixel is fairly constant for typical architectures and processes (i.e., the readout rate cannot be improved beyond a specified limit).

Prior art CMOS image sensors have the following disadvantages. First, the image sensor array is limited to a small pixel format. For example, a typical CMOS image sensor array includes 512 by 512 pixels. As processing and manufacturing techniques improve, and as smaller submicron geometries are achieved, pixel sizes decrease and hence, larger arrays are viable.

As the size of image arrays increases, the time before a pixel value is read out increases accordingly. Consequently, the size of the storage element for each pixel needs to be increased to maintain an accurate pixel value for read out.

Furthermore, prior art CMOS image sensors typically operate under a row mode. A row mode is a mode in which the image sensor array is exposed to light one row at a time, and each row is read out one row at a time.

There are many advantages to designing an image sensor having a frame mode instead of or in addition to a row mode. A frame mode is a mode in which all the pixels in the image sensor array are exposed during the same time, and then each row is read out one row at a time. The advantages of frame mode are 1) increased accuracy of the scene content; and 2) uniformity in exposure time and scene content.

In row mode, the electronic shutter retention time need only be a time from when the electronic shutter receives the value from the first photosensor in a row to the time that the value in the last photosensor of that row is read out. The retention time in a frame mode is much greater since each pixel must retain the pixel value from the time the value is transferred to the electronic shutter of that pixel to the time that pixel is read out. Obviously, pixels that are in the later rows must retain their pixel value longer than those pixels in earlier rows since the pixels in the earlier rows are read out sooner than the later pixels. The pixel in the last row of the array suffers the worst case retention time since these pixels must wait for pixels in all the other rows to be read out before their values are read out. When the pixels fail to accurately retain their values, undesirable artifacts, such as image smear, appear in the image.

Accordingly, there remains an unmet need in the industry for a method and apparatus for increasing the electronic shutter retention time in CMOS image sensors so that the CMOS image sensors can support frame mode operation and large pixel formats.

BRIEF SUMMARY OF THE INVENTION

In a pixel having an electronic shutter, a method of increasing the retention time of the electronic shutter is disclosed. A reset signal is employed to drive a diode node to a predetermined voltage immediately after integration is completed. A sample signal is employed to control a pass gate. The sample signal includes a state where the sample signal is a negative voltage.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

The method and apparatus to increase shutter retention time of the present invention is useful in a wide variety of applications. Any system or application that is concerned with shutter retention time would benefit from the present invention. For example, an application having a pixel array with a large number of pixels would need a mechanism to insure an increased shutter retention time. Similarly, in an application that employs frame mode, as discussed in the Background, would need a mechanism to prevent or minimize image smearing. Accordingly, as pixel arrays increase in size and as applications increasingly employ frame mode of operation, the present method and apparatus to increase shutter retention time will correspondingly have increased applications.

Moreover, the present invention finds wide application in numerous image capture devices. These image capture devices include, but are not limited to, cameras employed for PC video conferencing, camcorders, digital still cameras, security cameras and other surveillance equipment, and feature portable products such as PC videophones or cellular videophones. In all these products and applications, an important component is a sensor array that accurately detects incident light and converts the light into an electrical signal representative of the light.

Figure 1:
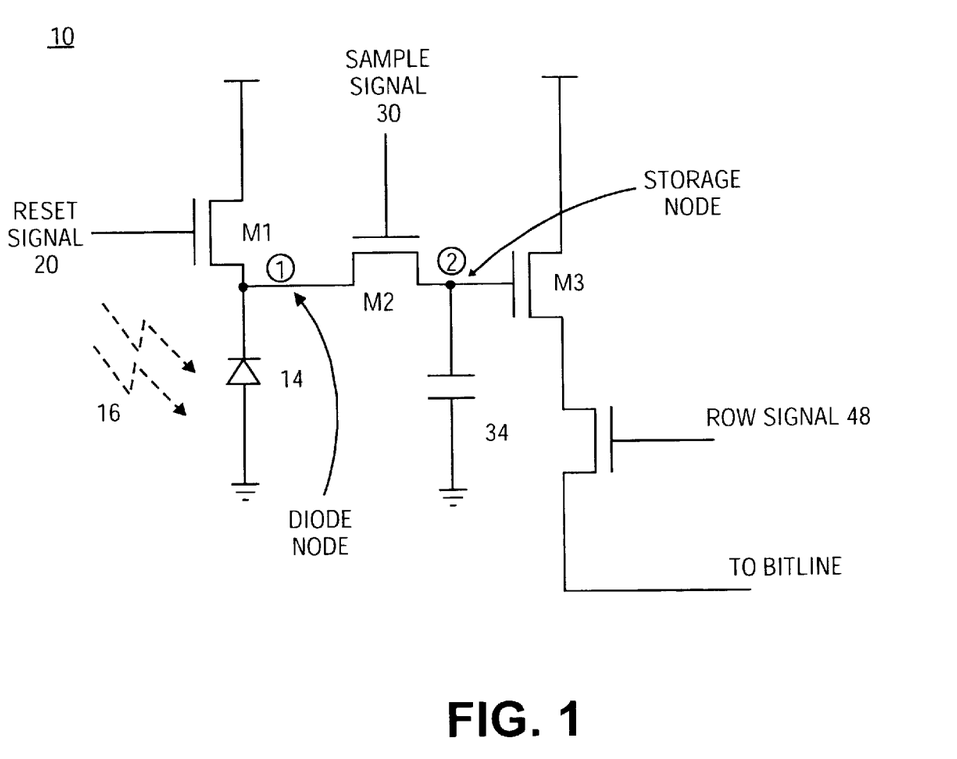
FIG. 1 illustrates a pixel in which the present invention can be implemented.

FIG. 1 illustrates a pixel 10 in which the present invention can be implemented. The pixel 10 includes a light sensing device (e.g., a photodiode) 14 that is coupled to a first transistor (M1) 18 and a second transistor (M2) 24. Transistor M2 is commonly known as a pass transistor that under the direction of a sample signal 30 selectively transfers the signal at node 1 (hereinafter referred to as the diode node) to node 2 (hereinafter referred to as the storage node). A capacitor 34 is coupled to the storage node.

The pass gate 24 and the capacitor 34 are collectively known as an electronic shutter. The electronic shutter is coupled to a third transistor (M3) 40 and a fourth transistor (M4) 44. Transistors M3 and M4 provide a read out function to the pixel 10. The present invention employs a row signal 48 that is provided to the gate of transistor M4 44 to control read out. The row, sample and reset signals are illustrated in greater detail in FIG. 2.

Transistor M1 includes a gate electrode for receiving a reset signal 20. The reset signal 20, which will be described in greater detail with reference to FIG. 2 selectively resets the pixel (i.e., drives the diode node to a predetermined voltage, such as, Vcc, where Vcc can be approximately 3.3V.)

The voltage at the storage node degrades over time due to 1) leakage from the drain diode of transistor M2 and 2) the subthreshold conduction through transistor M2. It is noted that the subthreshold conduction through transistor M2 is a dominant effect on submicron CMOS processes which is needed. to make arrays of a commercially viable size (i.e., arrays that have a commercially acceptable number of pixels). The present invention increases the retention time of the electronic shutter so that 1) large image sensor arrays become practical, and 2) frame mode is supported.

The present invention employs the following three mechanisms to increase the electronic shutter retention time: 1) Employing a Reset Signal to Drive the Diode Node to a Predefined Voltage After Integration is Complete; 2) Employing a Sample Signal That is Negative in Value to Drive the Gate of Transistor M2; and 3) Employing Metal Layers to Shield the Storage Node (Node 2).

I. Employing a Reset Signal to Drive the Diode Node to a Predefined Voltage After Integration is Complete The present invention employs the reset signal 20 to drive the diode node to a predetermined voltage (e.g., a high voltage near Vcc) after integration is complete. By driving the diode node to this predetermined voltage, the present invention guards against the subthreshold leakage of the pass transistor (M2) 30. The present invention employs the reset signal 20 to drive the diode node to a prespecified voltage after integration to insure that a minimum voltage Vgs of set of transistor M2 is determined by the voltage value (herein also referred to as pixel value) stored on the storage node (node 2).

The worst case in this configuration is when the pixel value at the storage node is at a minimum value (e.g., 1V). Because the diode node is driven to $V_{CC}-V_{tn}$ (e.g., 2.5V), transistor M2 is still turned off very well due to the body effect on transistor M2. The body effect raises the threshold storage $(V_t)$ of transistor M2 to limit leakage from the source to drain and to maintain the stored pixel value on the storage capacitor 34.

II. Employing a Sample Signal That is Negative in Value to Drive the Gate of Transistor M2

The present invention drives the gate of transistor M2 (also known as the pass transistor or the sample transistor) to a negative value to exponentially decrease the subthreshold current through transistor M2. Since a negative gate voltage causes transistor M2 to operate in a subthreshold region of operation, and subthreshold drain of transistor M2 to source current is an exponential function of voltage, the subthreshold current decreases exponentially. Specifically, the following equation which is known by those of ordinary skill in the art, governs the subthreshold current proportional to $V_{gs}$:

$$I_D = \mu (kT/q)^2 C_D W/L \{exp(q/kTn(V_{gs}-V_t)-q/2kT)\}\{1-exp(-qV_{DS}/kT)\}$$

In summary, driving the diode node to a predetermined voltage (e.g., high voltage) and employing a negative sample signal, reduces the leakage of the electronic shutter and, thereby increases the retention time of the capacitor 34.

III. Employing Metal Layers to Shield the Storage Node (Node 2)

The present invention also addresses leakage stemming from light being absorbed and integrated into the source junction of the pass transistor 24. By employing metal to shield this node from light, this leakage is minimized. The metal shield minimizes the number of photons incident on the source space-charge-region to a negligible level.

The basic operation of the pixel, shown in FIG. 1, will now be described in view of the three mechanisms to increase shutter retention time as taught by the present invention. The reset signal drives the diode node to a predetermined voltage and, thereby resets the photodiode 14. In one embodiment, this predetermined voltage can be $V_{CC}-V_{tn}$. Transistor M2 is also turned on during reset by employing the sample signal 30. The storage node is also driven to the same predetermined voltage (e.g., $V_{CC}-V_{tn}$).

The reset signal 20 is then deasserted, while the sample signal remains asserted during integration (also known as the exposure time). During integration, the photodiode 14 collects electrons from electron hole pairs which are generated in the photodiode space-charge region. In one embodiment of the present invention, the collection of electrons drives node 1 to a lower voltage, whose difference from the reset value is proportional to the intensity of the incident light 16. After a predetermined, user specified integration time, the sample signal is deasserted to turn off the pass gate (transistor M2). When the sample signal 30 is deasserted, the analog voltage on the diode node 1 is transferred or stored on the storage node (node 2).

The reset signal is then asserted. The sample signal 30 is driven to a negative voltage.

The source diffusion of transistor M2 is shielded from light using metal to prevent the decay of the value stored on the storage node by photogenerated electrons in the depletion region of the drain of transistor M2.

Figure 2:
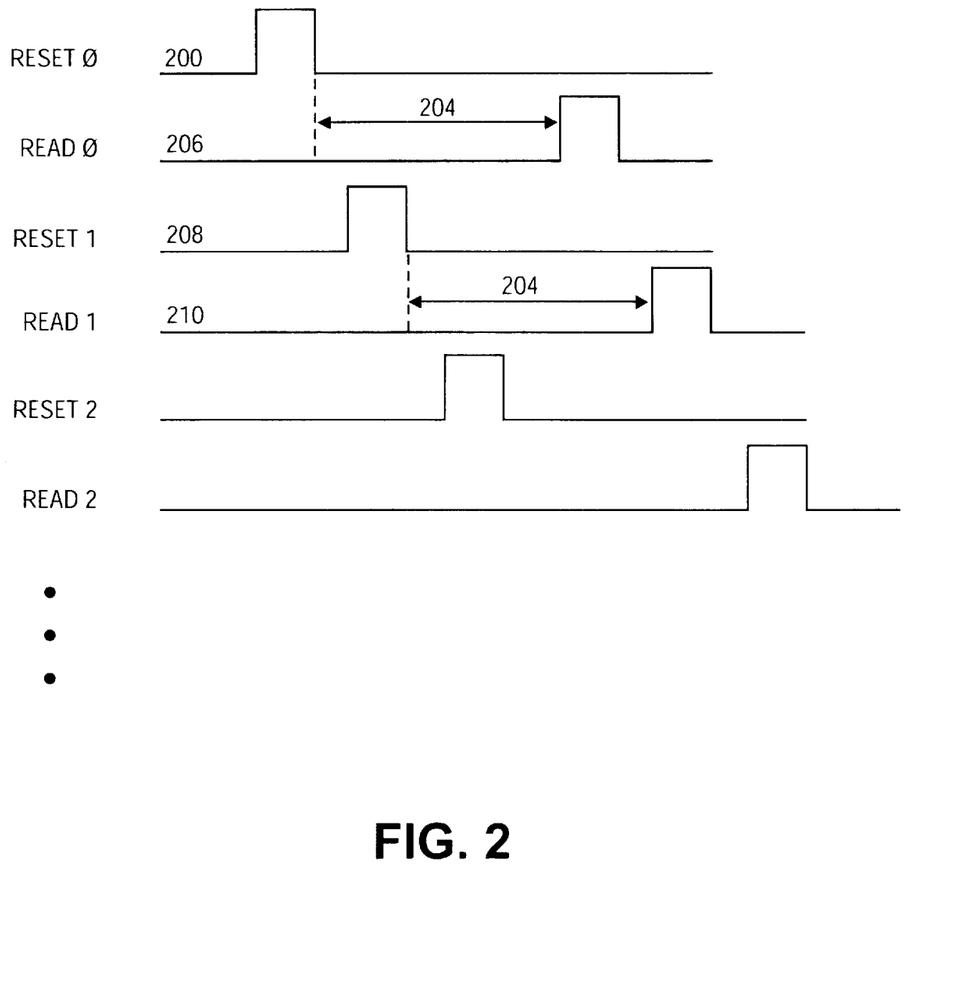
FIG. 2 is a timing diagram illustrating row mode operation for the improved pixel cell illustrated in FIG. 1.

FIG. 2 is a timing diagram illustrating row mode operation for the improved pixel cell illustrated in FIG. 1. In row mode, image capture occurs row by row. For example, a first reset signal (Reset 0, corresponding to Row 0) 200 is asserted to reset the pixel cells in Row 0. After a predetermined integration time 204, which can be selected to tailor a specific application, the first read signal 206 is asserted to read the pixel values for that row (e.g., Row 0). It should be noted that there is a separate reset signal and read signal for each row of the pixel array.

After the first reset signal 200 is deasserted, a second reset signal (reset 1) 208 corresponding to Row 1 is asserted to begin integration for Row 1. After the predetermined integration time 204, a second read signal (Read 1) 210 is asserted to read the pixels in Row 1. The sequence of asserting a reset signal for a row and then after a predetermined time 204 asserting the read signal for that row continues until all rows have captured pixel values and have been read out. The sample signal in this case is always asserted to allow the pixel value to be transferred from the first node to the storage node.

Figure 3:
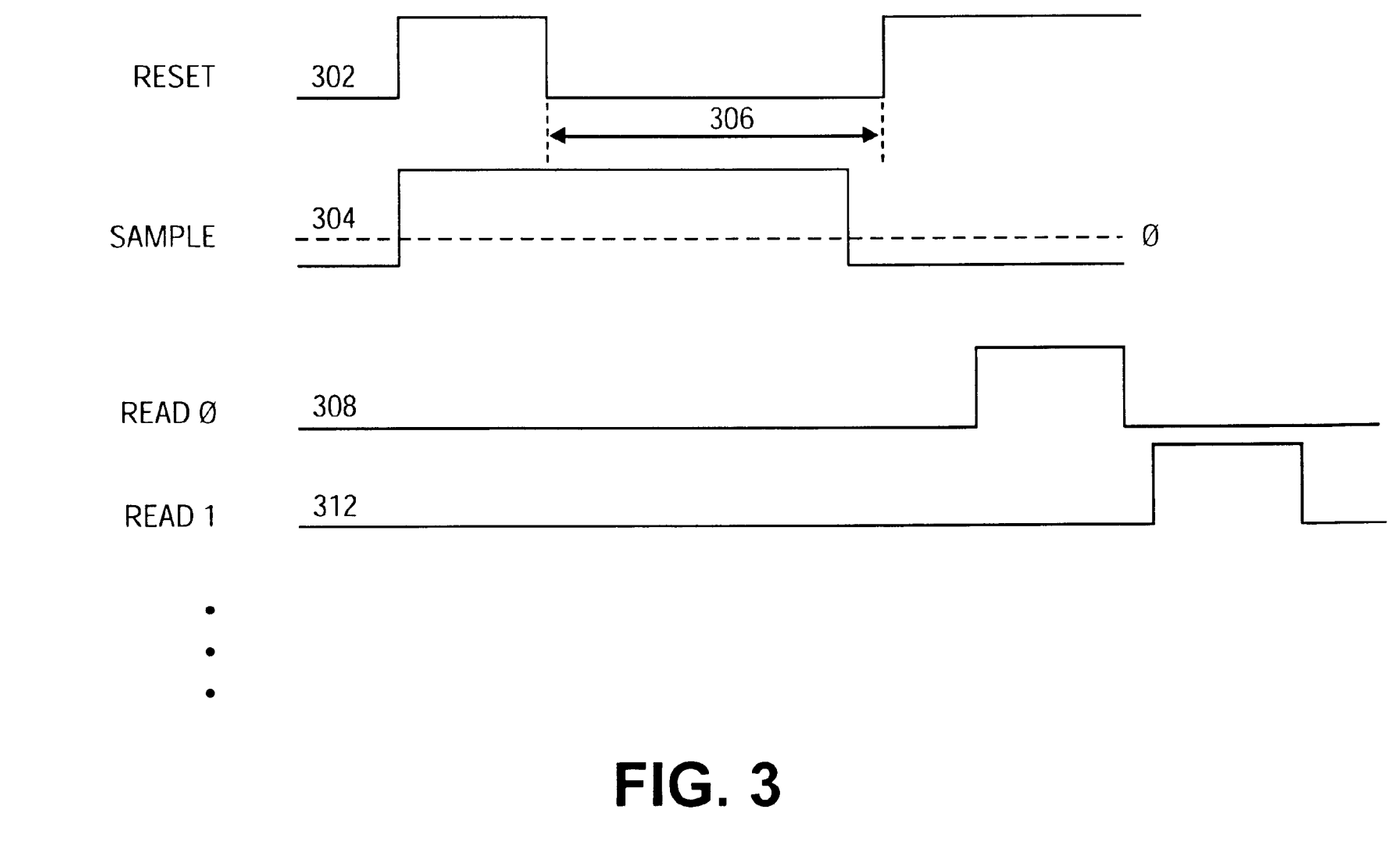
FIG. 3 is a timing diagram illustrating the frame mode operation of the improved pixel cell in accordance with the teachings of one embodiment of the present invention.

FIG. 3 is a timing diagram illustrating the frame mode operation of the improved pixel cell in accordance with the teachings of one embodiment of the present invention. In frame mode, the reset signal 302 and the sample signal 304 are coupled to all the rows. During the predetermined time interval 306 (e.g., from 1/10,000 second to 1 second) image data is collected on all pixels of all rows. After the sample signal 304 is deasserted, the rows are readout row by row. For example, a first read signal (Read 0) 308 is asserted to readout Row 0. Thereafter, a second read signal (Read 1) 312 is asserted to read out Row 1.

As noted previously, the present invention teaches asserting the reset signal 302 after the sample signal 304 is deasserted. Moreover, to further increase the retention time of the storage node, the present invention teaches that a sample signal 304, when in the deasserted state, should be a negative voltage. This negative voltage can be supplied by a charge pump or from an external supply.

Figure 4:
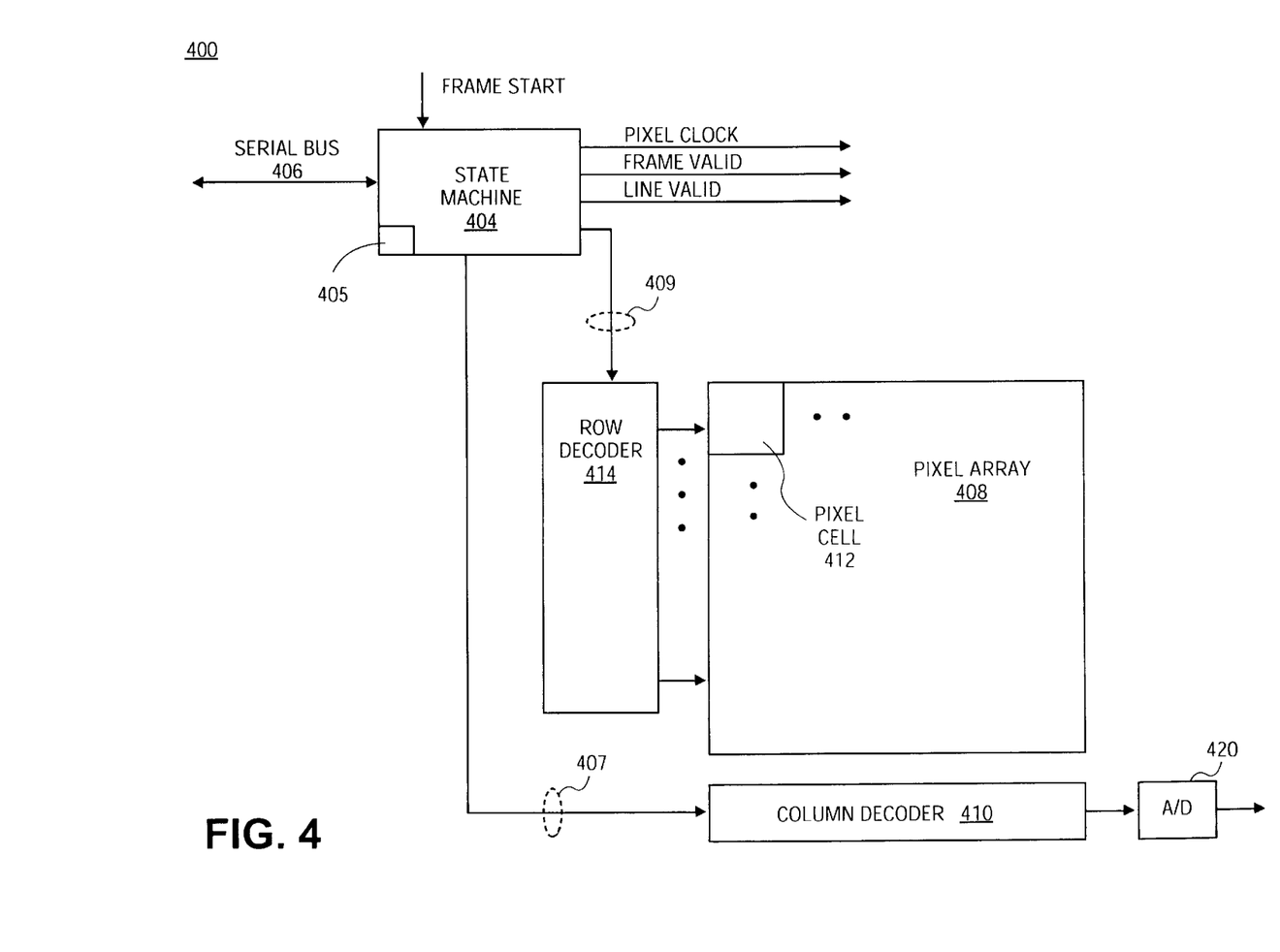
FIG. 4 illustrates a simplified block diagram illustrating an imager chip in which the present invention can be implemented.

FIG. 4 illustrates a simplified block diagram illustrating an imager chip 400 in which the present invention can be implemented. The imager integrated circuit (IC) 400 includes a state machine 404, a pixel array 408, a column decoder 410, a row decoder 414, and an analog-to-digital converter 420. The state machine 404 includes an input for receiving a frame_start signal which can be generated by the user of the digital camera or digital video camera. The frame_start signal instructs the imager chip to begin image capture. The state machine 404 includes a second input that is coupled to a serial databus 406 for communicating information between the imager IC 400 and a host processor or microcontroller (not shown).

The state machine 404 generates a pixel clock signal, a frame valid signal and a line valid signal. Frame valid is asserted to indicate valid data for each frame. Line valid is asserted at the start of each row. Pixel clock (CLK) is asserted to indicate when data for each pixel is valid. The state machine 404 also includes a first output for generating column control signals 407 and a second output for generating row control signals 409.

The imager chip 400 also includes a pixel array 408 having a plurality of pixel cells 412 arranged in rows and columns. The architecture of each pixel cell 412 has been described in detail with reference to FIG. 1. The pixel array 408 is coupled to a column decoder 410 and a row decoder 414. The column decoder 410 is coupled to the state machine 404 to receive the column control signals 407. State machine 404 provides address and timing information to the column decoder 410 and the row decoder 414. The row decoder 914 generates the row signal, the reset signal and the sample signal that are provided to each pixel cell that is described in FIG. 1.

The column decoder 410 receives data provided by each pixel cell (i.e., the signals from each of the bitlines of FIG. 1) and also receives timing and address information from the state machine 404. In response to these signals, the state machine 404 passes a selected bitline to the A/D circuit 420.

In response to these column control signals 407, the column decoder selects which bitline passes data to the A/D converter. The column decoder 410 also includes inputs for receiving data from the pixel array and an output for providing this data to an A/D converter 420. The A/D converter takes the analog pixel values from the column decoder 410 and generates a digital pixel value. The digital data is then communicated to the host processor or microcontroller via the serial bus 406.

The row decoder 414 includes an input for receiving the row control signals 409 and responsive thereto generates the reset signal 20, the sample signal 30 and the row signal 48, illustrated in FIG. 1.

Figure 5:
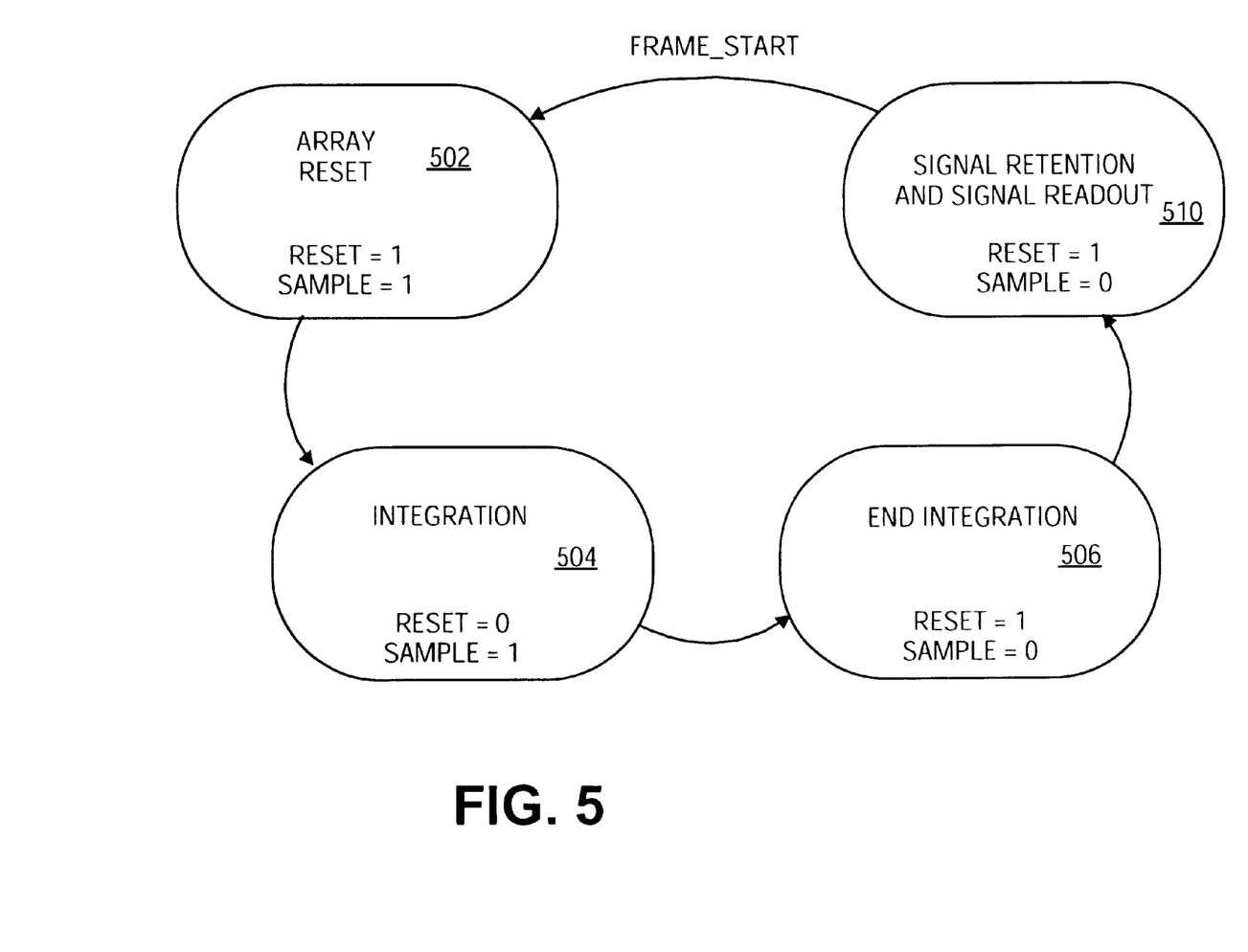
FIG. 5 is a state diagram illustrating the specific states of a state machine in accordance with the teachings of one embodiment of the present invention.

FIG. 5 is a state diagram illustrating the specific states of state machine 404 that can be used to implement the method of the present invention. The state diagram includes four states: the Array Reset State 502, the Integration State 504, the End Integration State 506 and the Signal Retention and Array Readout State 510. Each state represents two critical signals: the reset signal and the sample signal.

For the sake of clarity, Table I sets forth the state of the reset signal, the sample signal and corresponding state.

TABLE I

| Reset Signal | Sample Signal | Name of State |
|---|---|---|
| 1 | 0 | End Integration |
| 0 | 1 | Integration |
| 1 | 0 | Signal Retention |
| 1 | 1 | Array Reset |

The state machine 404 transitions from the array reset state 502 to the integration state 504 upon a predetermined elapsed time (e.g., approximately 5 μs). The state machine 404 transitions from the integration state 504 to the end integration state 506 based upon the integration time control signal, which is programmed through the serial bus. The integration time (i.e., time that the Sample signal is asserted) can be programmed through programmable registers that reside in the state machine 404.

State machine 404 includes a plurality of programmable registers 405. A host processor or microcontroller can program these registers to perform such operations such as windowing, setting the integration time, and controlling gain to the output.

The state machine 404 transitions from the End Integration State 506 to the Signal Retention and Array Readout State 510 upon a predetermined elapsed time (e.g., such as approximately 1 μs microseconds in the preferred embodiment). The state machine 404 transitions from the signal retention and array readout state 510 to the array reset state 502 when frame_start is asserted. An active frame start immediately initiates array reset which takes approximately 10 μs.

The method of the present invention increases the retention time in pixel cells so that frame mode operation can be achieved. As explained in the Background, since the time between the end of integration and the beginning of readout can be in the order of 10–15 microseconds, as compared to 2–3 μs in row mode. The techniques taught by the present invention are important to insure that pixel data is not lost during this period.

In summary, a method and apparatus for increasing the retention time of a storage element of the electronic shutter in a pixel having an electronic shutter have been disclosed. The electronic shutter includes a pass transistor and a storage element. The pass transistor includes a first electrode coupled to a diode node, a second electrode coupled to a storage node and a third electrode coupled to receive a sample signal. A reset transistor includes a first electrode coupled to the diode node and a second electrode coupled to receive a reset signal. The reset signal is employed to drive the diode node to a predetermined voltage after integration is complete. Integration refers to the time in which charge transfer occurs between the diode node and the storage node. The sample signal is employed to control the pass transistor. The sample signal includes a state where the sample signal is a negative voltage. Metal is employed to shield a storage node of the pass transistor.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. In a pixel having an electronic shutter, a method of increasing the retention time of the electronic shutter comprising:
   a) employing a reset signal to drive a diode node to a predetermined voltage immediately after an integration is complete and during readout, and to substantially inhibit subthreshold leakage from a storage node; and
   b) employing a sample signal to control a pass gate, said sample signal having a state where said sample signal is a negative voltage.

2. The method of claim 1 further comprising:
   employing metal to shield a source node of the pass gate.

3. A pixel controller comprising:
   a) a reset generator for providing a reset signal to control a first transistor and for driving the reset signal to a predetermined voltage immediately after integration is complete; and
   b) a sample signal generator, for providing a sample signal to control a pass gate.

4. The pixel controller of claim 3 further comprising:
   a row signal generator for generating a row signal that selectively reads out a value on the storage node and selectively provides said value to a bitline.

5. In an image capture system including a pixel, said pixel having a first node and a second node, a method of increasing the retention time of a pixel value on the second node, said method comprising:
   a) asserting a reset signal to reset a first node to a predetermined value;
   b) asserting a sample signal for a predetermined integration time to store a pixel value on the second node;
   c) driving said sample signal to a negative voltage after said predetermined integration time; and
   d) asserting said reset signal after said sample signal is driven to said negative voltage;
   wherein asserting said reset signal and driving of said sample signal to said negative voltage continues throughout the readout period.

6. The method of claim 5 further comprising:
   reading out the pixel values.

7. The method of claim 5 further comprising:
   reading out a first row of pixels.

8. The method of claim 7 further comprising:
   reading out a second row of pixels.

9. The method of claim 5 wherein the image capture system is operating in a frame mode.

10. The method of claim 5 wherein the image capture system is operating in a row mode.

11. A method of frame mode operation of a pixel array, said array having a plurality of pixel cells, each pixel cell having a reset transistor for receiving a reset signal, a sample transistor for receiving a sample signal, said method comprising:
    a) asserting a reset signal;
    b) asserting a sample signal;
    c) deasserting the reset signal to begin integration;
    d) deasserting the sample signal to stop integration and driving said sample signal to a negative voltage;
    e) asserting the reset signal immediately after the sample signal is deasserted; and
    f) reading out a pixel value for a first row.

* * * * *

UNITED STATES PATENT AND TRADEMARK OFFICE
CERTIFICATE OF CORRECTION

PATENT NO.    : 6,522,357 B2
DATED         : February 18, 2003
INVENTOR(S)   : Beiley et al.

It is certified that error appears in the above-identified patent and that said Letters Patent is hereby corrected as shown below:

<u>Column 8,</u>
Line 2, after "a pass gate", insert -- , said sample signal having a state where said sample signal is a negative voltage --.

Signed and Sealed this

Nineteenth Day of August, 2003

JAMES E. ROGAN
*Director of the United States Patent and Trademark Office*